(No Model.)  R. GORNALL.  2 Sheets—Sheet 1.
PEDO MOTOR.

No. 246,755. Patented Sept. 6, 1881.

Attest:
R. H. Barnes
F. L. Middleton

Inventor:
Richard Gornall
by Elec. S. __ atty (No Model.)

R. GORNALL.
PEDO MOTOR.

No. 246,755.

2 Sheets—Sheet 2.

Patented Sept. 6, 1881.

Attest:
R. F. Barnes.
F. L. Middleton

Inventor:
Richard Gornall
By Ellis Spear
Atty

UNITED STATES PATENT OFFICE.

RICHARD GORNALL, OF BALTIMORE, MARYLAND.

PEDO-MOTOR.

SPECIFICATION forming part of Letters Patent No. 246,755, dated September 6, 1881.

Application filed April 7, 1881. (No model.)

*To all whom it may concern:*

Be it known that I, RICHARD GORNALL, of Baltimore, in the county of Baltimore and State of Maryland, have invented a new and useful Improvement in Pedo-Motors; and I do hereby declare that the following is a full, clear, and exact description of the same.

My invention is an improvement upon the device for which a patent was granted me on the 25th day of November, 1879, and numbered 222,034.

It consists of certain details of construction, hereinafter set forth, whereby the apparatus is made more simple, lighter, more attractive, and is greatly improved in its operation.

Figure 1:
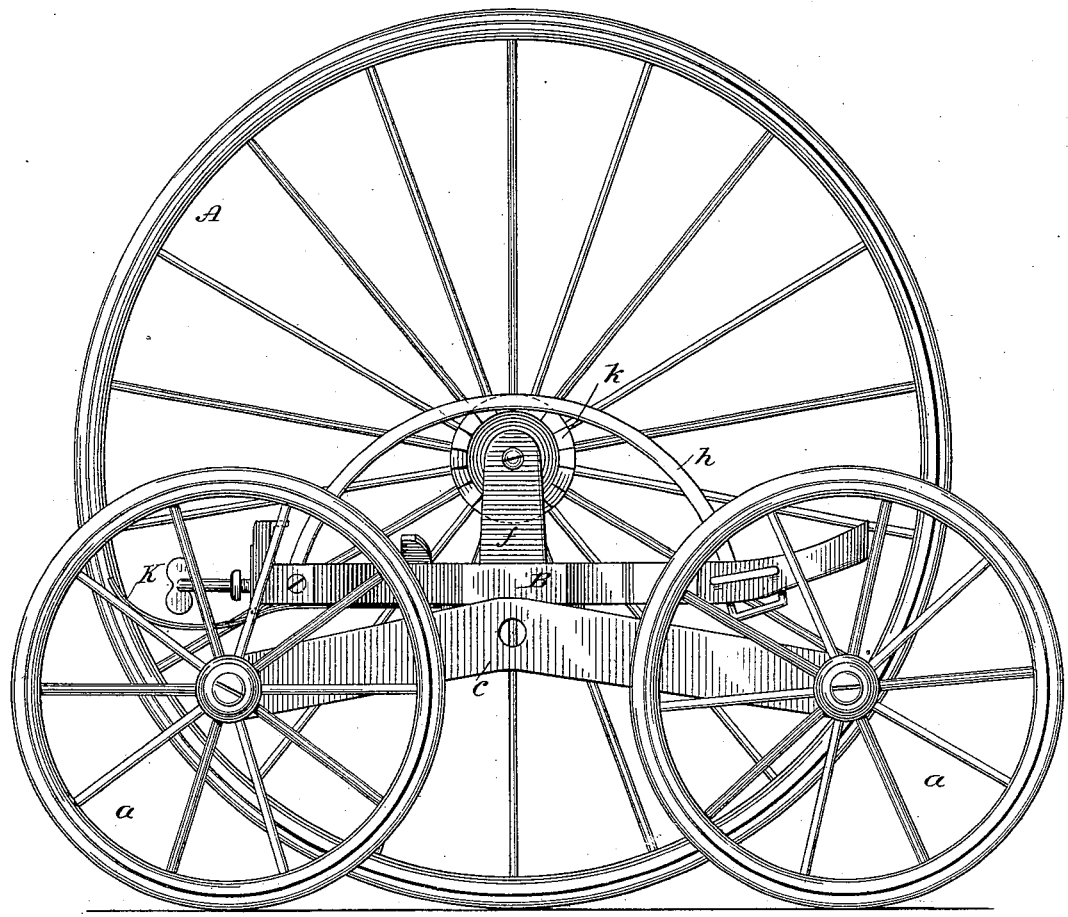
Figure 2:
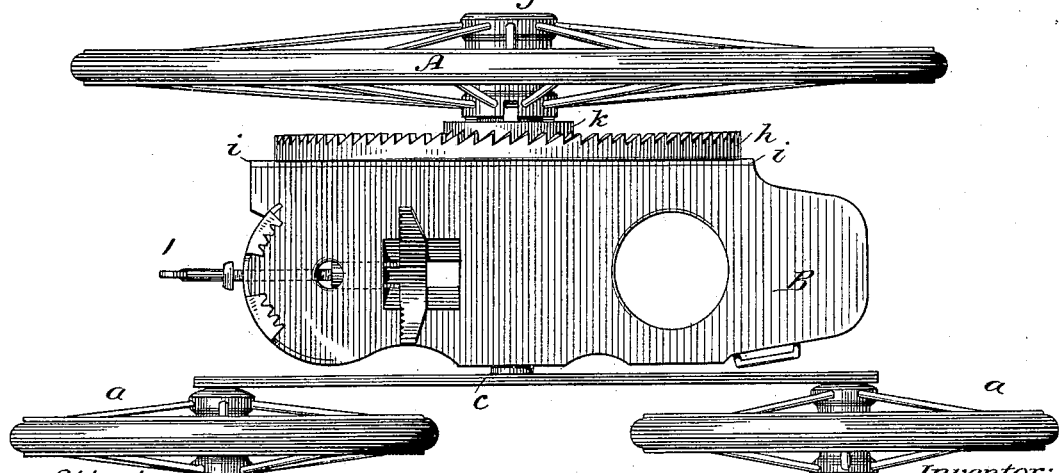
Figure 3:
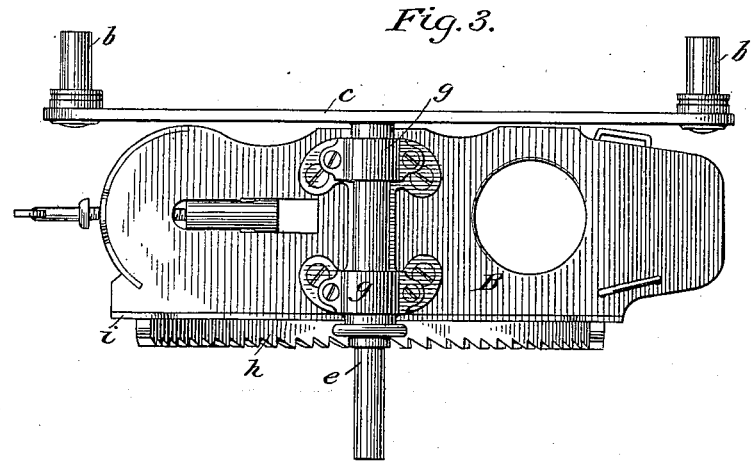
Figure 4:
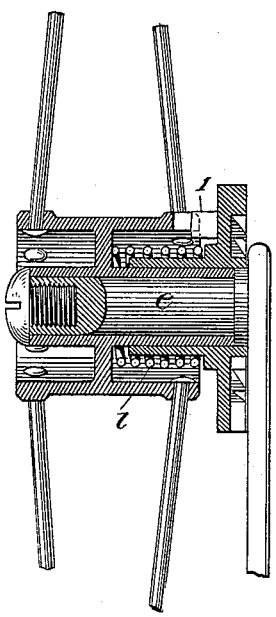

In the accompanying drawings, Figure 1 is a side view; Fig. 2, a plan view; Fig. 3, a plan view of the frame from beneath; Fig. 4, a section of the clutch.

In this device there are two small supporting-wheels, $a\ a$, and a large supporting and drive wheel, A, as in my said patent.

The improvements relate more particularly to the frame-work, the lowering of the foot-board, and to the arrangement of the rack-segment and ratchet-wheel. The supporting-wheels $a\ a$ are placed upon journals $b\ b$ in the end of the bar $c$. A little in rear of the center of this bar is fixed a shaft, $e$, which I prefer to make of a piece of metallic tubing. One end of it is supported in a hollow boss in the bar $c$, and the other in a like boss in the vertical bar or arm $f$. Upon this shaft $e$ rests the foot-piece B, being held thereto by means of clamps $g\ g$, and adapted to oscillate freely on said shaft. On the side next the drive-wheel is a rack-bar, $h$, connected to the foot-piece at the ends and arranged in a vertical plane, so as to bring the toothed side in contact with a ratchet-wheel placed upon the inner end of the hub of the drive-wheel. I prefer to strengthen the foot-piece and rack-bar on this side by means of a strip of metal, $i$, fixed to the edge and extending underneath the ends of the rack-bar.

The ratchet-wheel $k$ is loose upon a journal inside of the hub of the drive-wheel, but is made to turn with said wheel by means of studs 1 1, which project into recesses in the hub. The ratchet-wheel is pressed into connection with the rack-segment by means of a spring, $l$, and there is sufficient play allowed to the ratchet-wheel or clutch laterally to permit it to recede toward the hub and allow the teeth of the rack-segment to pass when said segment is moved backward.

It will be observed that the teeth of the rack-segment have their forward faces in a plane transverse to the apparatus and rear faces inclined. The teeth of the ratchet-wheel are similar, but in reversed position, so that when the forward part of the foot-piece is depressed the wheel is turned to move forward. When the heel is depressed the bar slips upon the ratchet-wheel without giving motion to the drive-wheel.

The journal of the drive-wheel is fixed upon the upper end of the bar or arm $f$. The whole frame-work is thus reduced to the horizontal and vertical bars, the transverse shaft, and the journals. The foot-piece is lowered without reducing the diameter of the wheels, so that larger wheels may be used and a corresponding increase in speed attained. It will be observed, also, that the rack-segment is bent upon a curve the center of which is the center of the shaft $e$, and that its upper edge is arranged to move approximately flush with the upper edge of the ratchet-wheel.

The form of the ratchet-connections is not essential, as other forms may be substituted for that shown—as, for instance, ball-connections—whereby the noise of the teeth may be obviated.

The frame-work may be formed of any suitable metal, and the method of constructing the special parts may be varied in ways well known to those skilled in the art of working in metals.

I contemplate casting the frame in one piece, in which case the shaft which supports directly the foot-piece would be solid, the general form of the frame remaining the same.

The brake, which is a necessary attachment in an apparatus of this character, is represented at K. It consists of a flat bar of spring steel, preferably turned up slightly at the end. It is attached to the under surface of the foot-piece, and projects to the rear a sufficient distance so that it may be made to bear upon the ground by putting the foot a little in advance and depressing the heel. One or both of the foot-pieces may be provided with the brake.

Having thus described my invention, what I claim, and desire to secure by Letters Patent, is—

1. In combination with the wheels $a\,a$ and A, the bars $c$ and $f$, supported upon the wheels and supporting the foot-piece, substantially as described.

2. In combination with the frame-work and the foot-piece, the rack-bar $h$ and ratchet-wheel $k$, said bar being arranged upon the foot-piece and adapted to engage with the wheel upon the inner end of the hub, substantially as described.

3. The combination of the bearing and drive wheels with a foot-piece placed lower than the axis of the drive-wheel, and with a driving-segment fixed to the foot-piece and projecting above it to operate upon the wheel, as set forth.

In testimony whereof I have signed my name to this specification in the presence of two subscribing witnesses.

RICHARD GORNALL.

Witnesses:
WM. H. BAYZAUD,
JOSHUA M. MYERS.